(12) United States Patent
Cousins et al.

(10) Patent No.: US 10,132,373 B2
(45) Date of Patent: Nov. 20, 2018

(54) METHOD FOR DETECTING AND MITIGATING EXCESSIVE CLUTCH DISC WEAR IN MANUAL TRANSMISSIONS

(71) Applicant: GM GLOBAL TECHNOLOGY OPERATIONS LLC, Detroit, MI (US)

(72) Inventors: William L. Cousins, Ortonville, MI (US); Glenn W. Hoefflin, Fenton, MI (US); David Howe, Pinckney, MI (US); Michael Partridge, Brighton, MI (US); Binu Jose Kochucheruvil, Shelby Township, MI (US)

( * ) Notice: Subject to any disclaimer, the term of this patent is extended or adjusted under 35 U.S.C. 154(b) by 0 days.

(21) Appl. No.: 15/209,381

(22) Filed: Jul. 13, 2016

(65) Prior Publication Data

US 2018/0031063 A1    Feb. 1, 2018

(51) Int. Cl.
*F16D 66/02* (2006.01)
*F16D 13/00* (2006.01)
*F16D 66/00* (2006.01)

(52) U.S. Cl.
CPC ............ *F16D 66/02* (2013.01); *F16D 13/00* (2013.01); *F16D 66/025* (2013.01); *B60W 2510/0225* (2013.01); *B60W 2510/0291* (2013.01); *B60W 2520/10* (2013.01); *F16D 2066/006* (2013.01); *F16D 2066/008* (2013.01)

(58) Field of Classification Search
CPC .. F16D 66/02; F16D 66/021; F16D 2066/006; F16D 2066/008; B60W 2510/0225; B60W 2510/0291
See application file for complete search history.

(56) References Cited

U.S. PATENT DOCUMENTS

| | | | |
|---|---|---|---|
| 2002/0123410 A1* | 9/2002 | Steeby | F16D 48/06 477/175 |
| 2007/0080004 A1* | 4/2007 | Pfund | B60W 10/02 180/65.25 |
| 2013/0060436 A1* | 3/2013 | Cousins | F16H 59/44 701/64 |

* cited by examiner

*Primary Examiner* — Edwin A Young

(57) ABSTRACT

A method for detecting and mitigating excessive clutch disc wear for a manual transmission includes determining if a clutch pedal position is depressed greater than or equal to a first predetermined pedal position threshold and if the vehicle speed is less than or equal to a predetermined vehicle speed threshold. The method further includes determining if the clutch pedal position is depressed greater than or equal to a second predetermined pedal position threshold when the clutch pedal position is depressed less than the first predetermined pedal position threshold. The method still further includes calculating a clutch disc heat flux value and a clutch disc surface temperature. The method further includes displaying an alert/warning and a remedial action message to a vehicle operator when the clutch disc surface temperature is greater than or equal to a predetermined surface temperature threshold.

16 Claims, 4 Drawing Sheets

METHOD FOR DETECTING AND MITIGATING EXCESSIVE CLUTCH DISC WEAR IN MANUAL TRANSMISSIONS

FIELD

The present disclosure relates to clutches for motor vehicle manual transmissions and, more particularly, to a method for detecting and mitigating excessive clutch disc plate wear in manual transmissions.

BACKGROUND

The statements in this section merely provide background information related to the present disclosure and may or may not constitute prior art.

Clutches for motor vehicle with manual transmissions provide a frictional, variable torque transmitting coupling between the vehicle prime mover and the transmission. Because of this function, significant heat can build up in the clutch disc plates, especially if the vehicle is driven hard or the clutch is operated partially engaged such as during abusive vehicle launch or hill/hold events.

This heat build-up can occur relatively quickly, and can approach temperatures that may cause significantly increased wear and possibly damage the clutch. To overcome the heat build-up concern, some have devised audible or visual warning systems to alert the vehicle operator if the clutch temperature is too high.

Although experienced vehicle operators may readily respond to such warnings by changing their driving behavior to remediate the problem, a less experienced operator may not know what corrective action to take such that warning events stop occurring.

From the foregoing, it is apparent that approaches to detect and warn vehicle operators when their driving behavior may be causing damage to the vehicle's clutch but aspects of the disclosed exemplary embodiment seeks to provide better solutions.

SUMMARY

Aspects of an exemplary embodiment provide a method for detecting and mitigating excessive clutch disc plate wear in manual transmissions while driving. The method includes determining if a clutch pedal position is depressed greater than or equal to a first predetermined pedal position threshold and if the vehicle speed is less than or equal to a predetermined vehicle speed threshold. A further aspect of the method includes determining if the clutch pedal position is depressed greater than or equal to a second predetermined pedal position threshold when the clutch pedal position is depressed less than the first predetermined pedal position threshold.

The method continues with recording a cumulative time value when the clutch pedal position is depressed greater than or equal to the second predetermined pedal position threshold and when the clutch pedal position is depressed less than the first predetermined pedal position threshold. Another aspect of the exemplary embodiment includes calculating clutch torque based on engine speed and the clutch pedal position. Still another aspect includes calculating a clutch disc angular velocity based on the engine speed and transmission input shaft speed.

The method continues with calculating cumulative clutch dissipated heat energy based on the clutch disc angular velocity, the clutch torque and the recorded cumulative time value when the clutch disc angular velocity is greater than or equal to zero. Another aspect of the exemplary embodiment includes calculating clutch disc heat flux value based on the cumulative clutch dissipated heat energy, the recorded cumulative time value and a clutch disc surface area. A still further aspects include calculating clutch disc surface temperature based on the cumulative clutch dissipated heat energy and the clutch disc heat flux value and displaying an alert and a remedial action message to a vehicle operator when the clutch disc surface temperature is greater than or equal to a predetermined surface temperature threshold.

Another aspect of the exemplary embodiment includes storing a clutch bulk temperature and a real time temperature decay value in an engine control module.

It is a further aspect of the exemplary embodiment storing the clutch bulk temperature further includes calculating the clutch bulk temperature based on the cumulative clutch dissipated heat energy, clutch mass, and the specific heat of iron.

It is a still further aspect of the exemplary embodiment wherein determining the clutch pedal position further includes providing an output of a clutch pedal position sensor to an engine control module.

It is a still further aspect of the exemplary embodiment wherein calculating the clutch disc angular velocity further comprises determining the engine speed based on providing the output of a crankshaft position sensor to an engine control module.

It is a still further aspect of the exemplary embodiment wherein displaying the alert and remedial action message further comprises determining if the clutch pedal position is greater than or equal to the second predetermined pedal position threshold.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
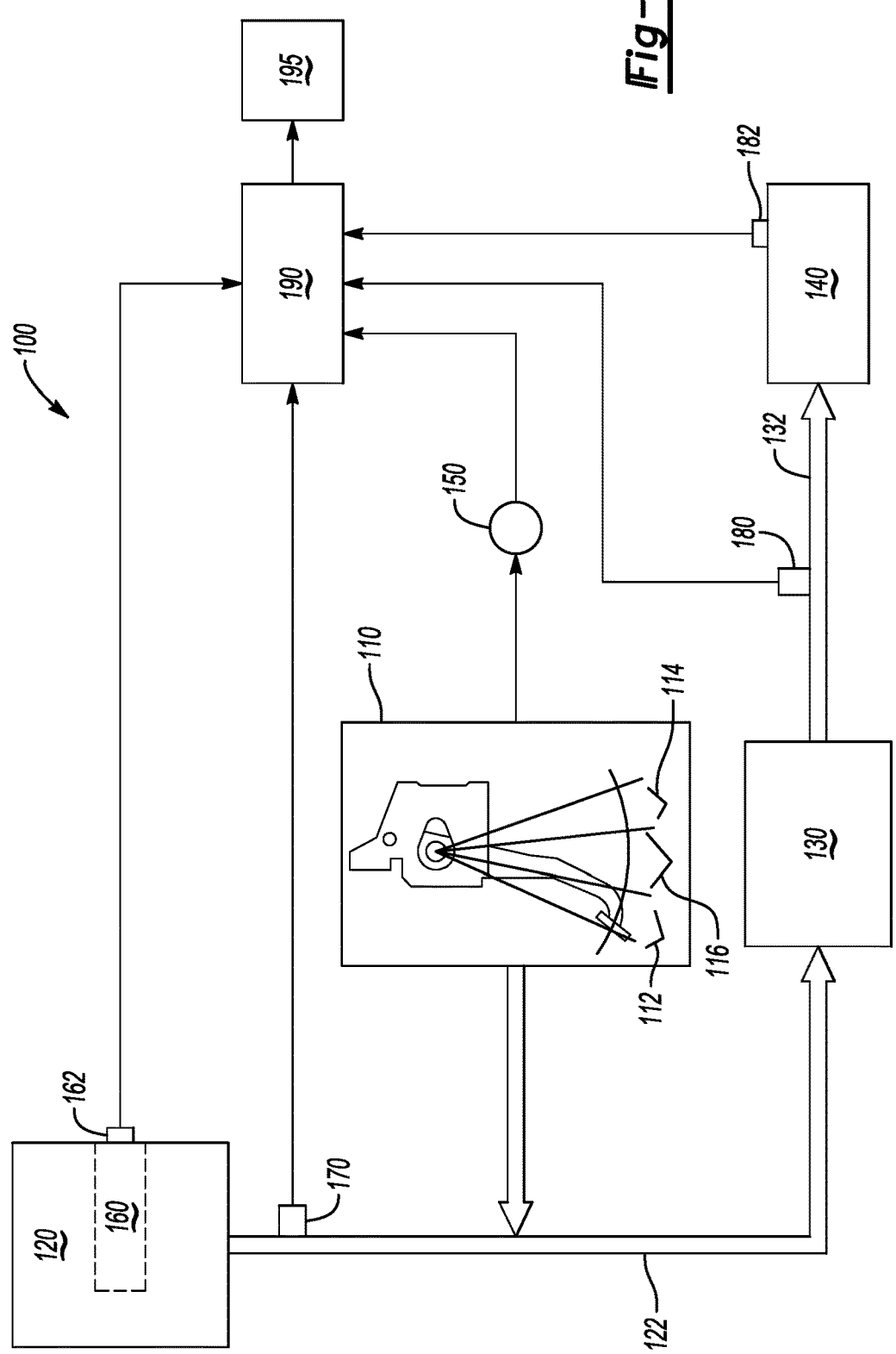
FIG. 1 illustrates aspects of an exemplary embodiment of a system block diagram for detecting and mitigating excessive clutch disc plate wear in manual transmissions while driving.

The following description is merely exemplary in nature and is not intended to limit the present disclosure, application, or uses.

According to aspects of an exemplary embodiment of a method for detecting and mitigating excessive clutch disc plate wear in manual transmissions while driving, a system block diagram 100 is illustrated. The system 100 includes a clutch pedal 110 operative to engage and disengage a clutch disc plate (not shown) of a vehicle's transmission to the flywheel (not shown) of an engine 120. The flywheel of the engine 120 continuously spins when the engine 120 is on. When the clutch pedal 110 is in a released position 112, the clutch disc plate fixedly engages the spinning flywheel of the engine 120 through frictional forces and causes a rotational torque to be delivered the transmission 130 via an input shaft 122. The rotational torque is further delivered from the transmission 130 to the drive wheels 140 of the vehicle via the transmission output shaft 132.

When the clutch pedal 110 is in a depressed position 114, the clutch disc plate is disengaged from the flywheel of the engine 120 and the rotational torque is no longer delivered to the transmission 130 via the transmission input shaft 122. As such, the rotational torque is no longer delivered to the drive wheels 140 via the transmission output shaft 132.

Under certain circumstances, a vehicle operator may unknowingly operate the clutch pedal 110 in an abusive manner that could lead to premature clutch failure due to excessive wear to the clutch disc plate. When the clutch disc plate is not fully engaged or disengaged to the flywheel of the engine 120 as illustrated at 116 of FIG. 1, frictional forces can operate to grind the surface of the clutch disc plate which ultimately could result in the full rotational torque of the flywheel of the engine 120 not being delivered to the drive wheels 140. This is commonly referred to as "clutch slippage" and can result from driving behaviors such as abusive vehicle launch and/or hill/hold events. An aspect of the exemplary embodiment herein is proposed to encourage improved driving behaviors as they relate to clutch usage and serve to educate uninformed drivers of abusive clutch events that may lead to premature clutch failure.

Still referring to FIG. 1, system 100 includes a clutch pedal position sensor 150 for determining the position of the clutch pedal 110 which is used to calculate the clutch torque instead of using a unique torque sensor as according to an aspect of the exemplary embodiment. The clutch pedal position sensor 150 is in communication with an electronic control module (ECM) 190 that is operable to calculate the clutch torque based on the clutch pedal position.

A crankshaft position sensor 162 is disposed at or near the crankshaft 160 and is operable to determine the crankshaft angular velocity and engine speed as the crankshaft 160 spins. It is appreciated that other unique sensors may be used to determine engine speed but use of such sensors are considered to be within the scope of the exemplary embodiment. The crankshaft position sensor 162 is in communication with the ECM 190 which is operable to determine engine speed based the sensor 162 data.

As according to an exemplary embodiment, a transmission output speed sensor 180 is in communication with the ECM 190 for determining the angular velocity of the transmission output shaft. The transmission output speed sensor 180 data is used to calculate both the transmission input shaft 122 angular velocity as well as the vehicle speed. Alternatively, it is appreciated that a transmission input speed sensor 170 and a wheel speed sensor 182 may be placed in communication with the ECM 190 for determining the angular velocity of the transmission input shaft 122 and the vehicle speed, respectively.

According to an aspect of the exemplary embodiment, the ECM 190 is operable to receive data from the clutch pedal position sensor 150, the crankshaft position sensor 162, the transmission input speed sensor 170, and the transmission output speed sensor 180 and perform the calculations required for determining the clutch disc plate surface temperature. If the ECM 190 determines that the clutch disc plate surface temperature is greater than or equal to a predetermined surface temperature threshold then the ECM 190 will cause the driver information center (DIC) 195 or similar device to display an warning/alert to the driver of such condition and an instruction to take a remedial action to the current driving behavior to alleviate such condition.

Figure 2:
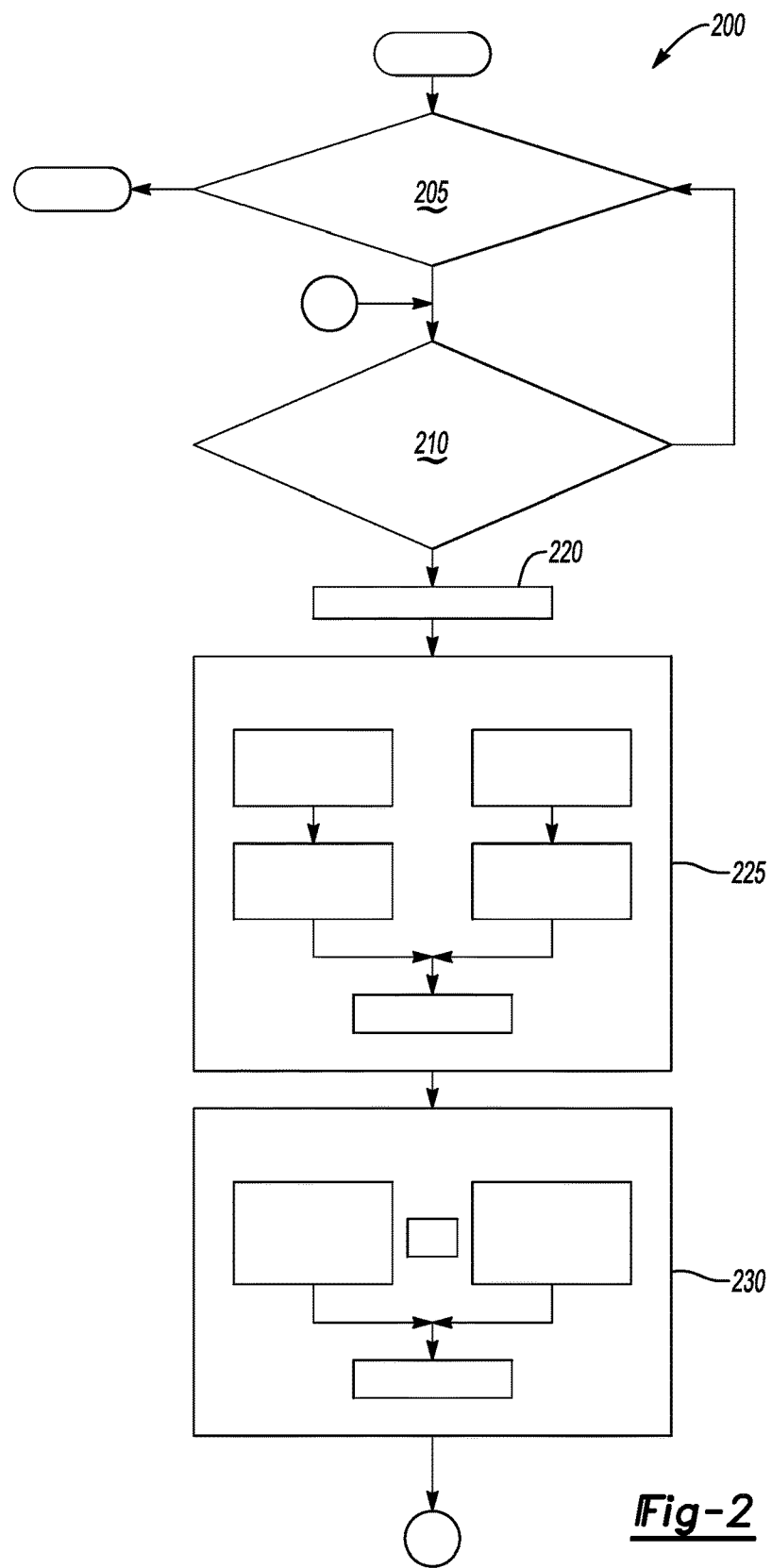
FIG. 2 illustrates aspects of an exemplary embodiment of a process flow diagram of the method for detecting and mitigating excessive clutch disc plate wear in manual transmissions while driving.

Referring to FIG. 2, an exemplary embodiment of a method 200 for detecting and mitigating excessive clutch disc surface wear in manual transmissions while driving is illustrated.

At block 205, the method begins with determining if the engine 120 is on and if the vehicle speed is determined to be less than or equal to a predetermined vehicle speed threshold. It is appreciated that this can be accomplished through the use of one or more of sensing devices in communication with an engine control module (ECM) 190. For example, this may be accomplished by reading the crankshaft position sensor 162 to determine the engine speed. If the engine is off and the vehicle speed is determined to be greater than the predetermined vehicle speed threshold, then no further action is taken. If the engine is determined to be on and the vehicle speed is greater than the predetermined vehicle speed threshold, then the method continues to block 210. The predetermined vehicle speed threshold is equal to two (2) miles per hour.

At block 210, the clutch pedal position sensor 162 is used with the ECM 190 to determine the clutch pedal 110 position. If the clutch pedal 110 position is depressed less than a first predetermined clutch pedal position threshold and greater than a second clutch pedal position threshold then the method continues to block 220. If the clutch pedal 110 position is depressed greater than or equal to the first predetermined pedal position threshold or less than or equal to the second predetermined clutch pedal position threshold- then the method returns to block 205. In accordance with aspects of one exemplary embodiment, the first predetermined pedal position threshold is greater than or equal to seventy percent (70%) of being fully depressed, the second predetermined pedal position threshold is greater than or equal to thirty one percent (31%) of being fully depressed.

At block 220, the ECM 190 starts recording a cumulative time value as according to an aspect of the exemplary embodiment.

At block 225, the method continues with calculating clutch torque based on engine speed and the clutch pedal position rather than using a unique torque sensor. The measured engine speed and measured clutch pedal position are used in conjunction with a torque look-up table and a torque transfer look-up table, respectively, for determining the clutch torque according to aspects of an exemplary embodiment.

At block 230, the method continues with calculating a clutch disc angular velocity based on engine speed and the calculated transmission input shaft speed rather than using a unique input shaft speed sensor. In this manner, the transmission gear train ratio is taken into consideration with the assumption that a launch event is occurring. As according to aspects of the exemplary embodiment, the engine speed is determined based on the output of the crankshaft position sensor 162 read by the ECM. An aspect of an alternative exemplary embodiment would include a gear absolute position (GAP) sensor (not shown) for improving the overall accuracy of the clutch disc plate surface temperature. The GAP sensor would provide the ability to recognize abusive launch events in gears other than first gear, e.g., second or third gear. An abusive launch in third gear can be very abusive and is capable of dissipating more heat energy than an abusive launch event in first gear.

Figure 2A:
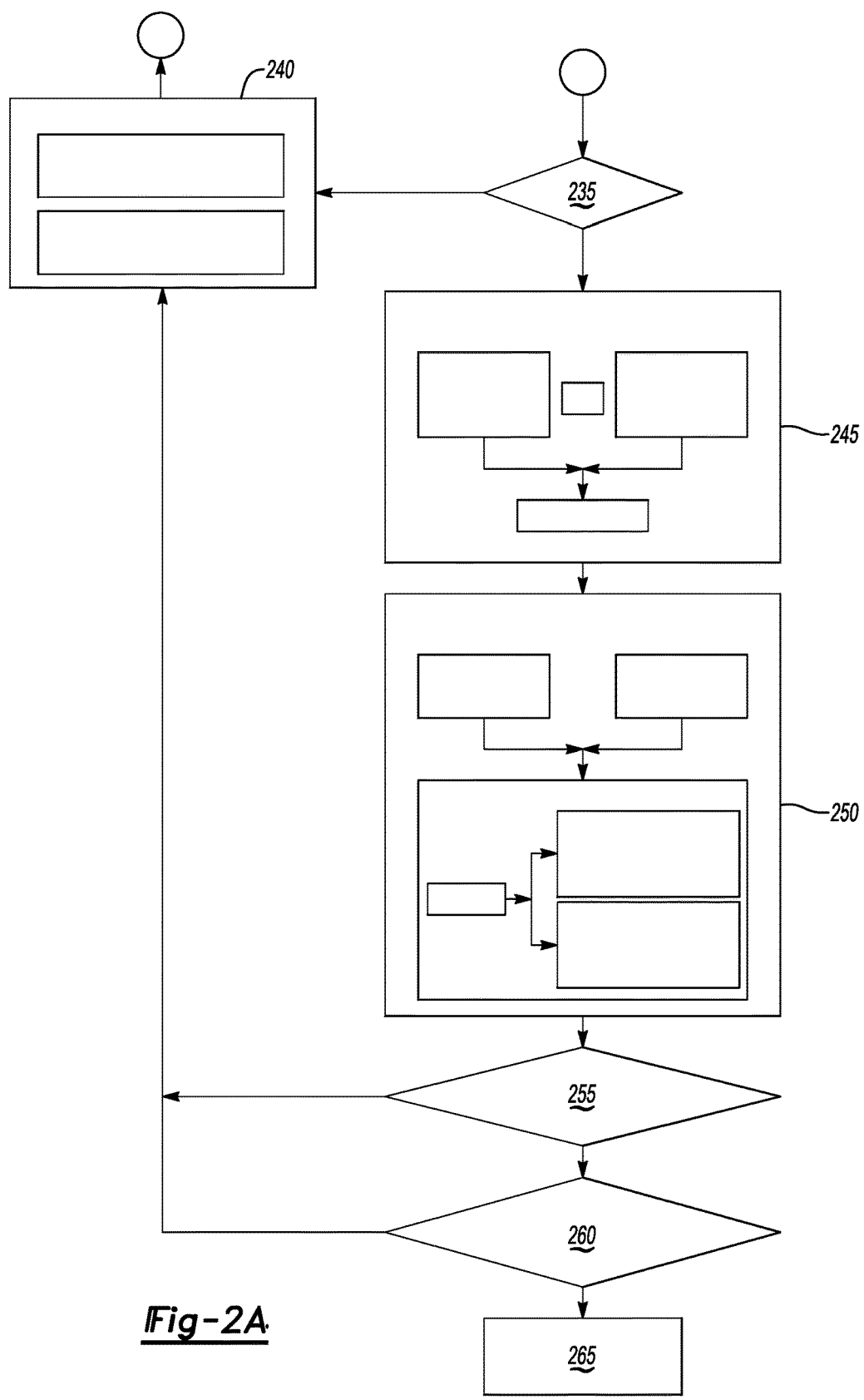
FIG. 2A illustrates a continuation of the exemplary embodiment of a process flow diagram of the method detecting and mitigating excessive clutch disc plate wear in manual transmissions while driving.

Referring now to block 235 of FIG. 2A, the method continues with determining if the clutch disc angular velocity is greater than or equal to zero (0). The clutch disc angular velocity is determined by calculating the difference between the engine speed and the transmission input shaft speed. If the clutch disc angular velocity is greater than or equal to zero (0) then, at block 245, the method continues with calculating a cumulative clutch dissipated heat energy based on the clutch disc angular velocity, the clutch torque and the recorded cumulative time value. If the clutch disc angular velocity is not greater than or equal to zero (0) then, at block 240, the method continues temporarily storing the clutch bulk temperature and a real time temperature decay value in the ECM 190. The real time temperature decay value is used in determining the impact that heat dissipation will have on the real time value of the clutch disc surface temperature.

At block 250, the method continues with calculating the clutch disc surface temperature based on the cumulative clutch dissipated heat energy and the clutch disc heat flux value. The real time temperature decay value is also used in calculating the clutch disc surface temperature when more than one (1) abusive launch event has occurred. On the first abusive launch event an ambient temperature value is used to calculate the clutch disc surface temperature instead of the real time temperature value. In accordance with as aspect of the exemplary embodiment the ambient temperature is considered to be 40° C.

At block 255, the method continues with determining if the clutch pedal 110 position is less than or equal to the second predetermined pedal position threshold. If the clutch pedal 110 position is determined to be less than or equal to the second predetermined pedal position threshold then the method returns to block 240 and then to block 210 to start the method again.

If the clutch pedal 110 position is not less than the second predetermined pedal position then, at block 260, the method continues with determining if the clutch disc surface temperature is greater than or equal to a predetermined surface temperature threshold. If the clutch disc surface temperature is greater than or equal to the predetermined surface temperature threshold then, at block 265, the ECM 190 responds by displaying an alert/warning and a remedial action message on the driver information center (DIC) 195. In an aspect of the exemplary embodiment the would be similar to:

"Warning: Clutch Temperature High—Apply or Release Clutch Pedal"

It is appreciated that other alert/warnings and remedial action messages may be used that, although not explicitly disclosed herein, are intended to be within the scope of aspects of the exemplary embodiment. However, it is desirable not to make the alert/warning and remedial action messages too aggressive such that a customer may become annoyed or displeased with the feature.

If the clutch disc surface temperature is not determined to be greater than or equal to the predetermined surface temperature then the method returns to block 240 and the to block 210 to start the method again.

Figure 3:
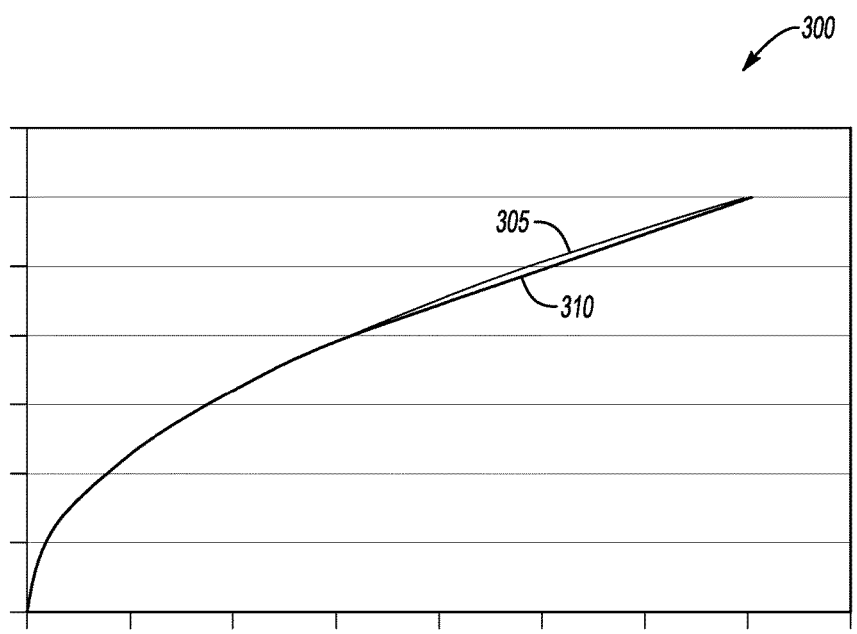
FIG. 3 illustrates a graph of the relationship between (cumulative clutch heat energy*clutch heat flux) and the clutch disc surface temperature as according to aspects of the exemplary embodiment.

Referring now to FIG. 3, an illustration of a graph 300 of the relationship between (cumulative clutch heat energy*clutch heat flux) and the clutch disc surface temperature as according to aspects of the exemplary embodiment is provided. Plot 305 is the power trend line for the finite element analysis calculated results in comparison to plot 310 is the regression results calculation data of the plot 305 trend line, or the correlation study results of the surface temperature data obtained from the calculation method as according to aspects of the exemplary embodiment. It illustrates that the data resulting from the exemplary method has very good correlation to the data obtained by performing finite element analysis calculations.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for detecting and mitigating excessive clutch disc wear in manual transmissions while driving, the method comprising:
   determining if a vehicle speed is less than or equal to a predetermined vehicle speed threshold;
   determining if a clutch pedal position is depressed less than a first predetermined clutch pedal position threshold and greater than or equal to a second predetermined clutch pedal position threshold when the vehicle speed is less than or equal to the predetermined vehicle speed threshold;
   calculating a clutch disc heat flux value based on a cumulative clutch dissipated heat energy, a cumulative time value and a clutch disc face area;
   calculating a clutch disc surface temperature based on the cumulative clutch dissipated heat energy and the clutch disc heat flux value; and
   displaying an alert and a remedial action message to a vehicle operator when the clutch disc surface temperature is greater than or equal to a predetermined surface temperature threshold.

2. The method of claim 1 further comprising storing a clutch bulk temperature and a real time temperature decay value in an engine control module.

3. The method of claim 2 wherein storing the clutch bulk temperature further comprises calculating the clutch bulk temperature based on the cumulative clutch dissipated heat energy, a clutch mass, and a specific heat of iron.

4. The method of claim 1 further comprising recording a cumulative time value when the clutch pedal position is depressed greater than or equal to the second predetermined clutch pedal position threshold and when the clutch pedal position is depressed less than the first predetermined clutch pedal position threshold.

5. The method of claim 4 further comprising calculating a clutch torque based on an engine speed and the clutch pedal position.

6. The method of claim 5 further comprising calculating a clutch disc angular velocity based on the engine speed and a transmission input shaft speed.

7. The method of claim 6 further comprising calculating the cumulative clutch dissipated heat energy based on the clutch disc angular velocity, the clutch torque and the recorded cumulative time value when the clutch disc angular velocity is greater than or equal to zero.

8. The method of claim 7 wherein calculating the clutch disc angular velocity further comprises determining the engine speed based on providing an output of a crankshaft position sensor to an engine control module.

9. The method of claim 1 wherein determining the clutch pedal position further comprises providing an output of a clutch pedal position sensor to an engine control module.

10. The method of claim 1 wherein displaying the alert and remedial action message further comprises determining if the clutch pedal position is greater than or equal to the second predetermined clutch pedal position threshold.

11. A method for detecting and mitigating excessive clutch disc wear in manual transmissions while driving, the method comprising:
   determining if a vehicle speed is less than or equal to a predetermined vehicle speed threshold;
   determining if a clutch pedal position is depressed less than a first predetermined clutch pedal position threshold and greater than or equal to a second predetermined clutch pedal position threshold when the vehicle speed is less than or equal to the predetermined vehicle speed threshold;
   recording a cumulative time value when the clutch pedal position is depressed greater than or equal to the second predetermined clutch pedal position threshold and when the clutch pedal position is depressed less than the first predetermined clutch pedal position threshold;
   calculating a clutch torque based on an engine speed and the clutch pedal position;
   calculating a clutch disc angular velocity based on the engine speed and a transmission input shaft speed;
   calculating a cumulative clutch dissipated heat energy based on the clutch disc angular velocity, the clutch torque and the recorded cumulative time value when the clutch disc angular velocity is greater than or equal to zero;
   calculating a clutch disc heat flux value based on the cumulative clutch dissipated heat energy, the cumulative time value and a clutch disc surface area;
   calculating a clutch disc surface temperature based on the cumulative clutch dissipated heat energy and a clutch disc heat flux value; and
   displaying an alert and a remedial action message to a vehicle operator when the clutch disc surface temperature is greater than or equal to a predetermined surface temperature threshold and when the clutch pedal position is greater than or equal to the second predetermined clutch pedal position threshold and when the clutch pedal position is depressed less than the first predetermined clutch pedal position threshold.

12. The method of claim 11 further comprising storing a clutch bulk temperature and a real time temperature decay value in an engine control module.

13. The method of claim 12 wherein storing the clutch bulk temperature further comprises calculating the clutch bulk temperature based on the cumulative clutch dissipated heat energy, a clutch mass, and a specific heat of iron.

14. The method of claim 11 wherein the first predetermined clutch pedal position threshold is greater than or equal to seventy percent of being fully depressed.

15. The method of claim 11 wherein the second predetermined clutch pedal position threshold is greater than or equal to thirty one percent of being fully depressed.

16. The method of claim 11 wherein the predetermined surface temperature threshold is 250° C.

\* \* \* \* \*